(12) United States Patent
Beernaert et al.

(10) Patent No.: US 12,077,094 B2
(45) Date of Patent: Sep. 3, 2024

(54) PROJECTION ALERTING SYSTEM FOR VEHICLES AND RELATED METHODS

(71) Applicant: SMARTREND MANUFACTURING GROUP (SMG), INC., Winnipeg (CA)

(72) Inventors: David Beernaert, Winnipeg (CA); Kevin Smith, Winnipeg (CA); Meng Liang, Winnipeg (CA); Andrew McKay, Winnipeg (CA); Jorgen Kaspick, Winnipeg (CA)

(73) Assignee: SMARTREND MANUFACTURING GROUP (SMG), INC., Winnipeg (CA)

( * ) Notice: Subject to any disclaimer, the term of this patent is extended or adjusted under 35 U.S.C. 154(b) by 217 days.

(21) Appl. No.: 17/620,400

(22) PCT Filed: Jun. 19, 2020

(86) PCT No.: PCT/CA2020/050857
§ 371 (c)(1),
(2) Date: Dec. 17, 2021

(87) PCT Pub. No.: WO2020/252591
PCT Pub. Date: Dec. 24, 2020

(65) Prior Publication Data
US 2022/0348134 A1 Nov. 3, 2022

Related U.S. Application Data (60) Provisional application No. 62/939,898, filed on Nov. 25, 2019, provisional application No. 62/863,599, filed on Jun. 19, 2019.

(51) Int. Cl.
*B60Q 1/26* (2006.01)
*B60Q 1/50* (2006.01)
(Continued)

(52) U.S. Cl.
CPC ............... *B60Q 1/26* (2013.01); *B60Q 1/547* (2022.05); *F21S 43/14* (2018.01);
(Continued)

(58) Field of Classification Search
CPC ...... B60Q 1/26; B60Q 1/547; B60Q 2400/50; F21S 43/14; F21W 2103/60; F21W 2107/10; F21Y 2115/10
See application file for complete search history.

(56) References Cited

U.S. PATENT DOCUMENTS 8,669,853 B1 * 3/2014 Gardner ................... B60Q 1/24
340/471
2006/0012307 A1 1/2006 Bucher et al.
(Continued)

FOREIGN PATENT DOCUMENTS

| WO | WO-2015/032795 A2 | 3/2015 |
| WO | WO-2016/054233 A1 | 4/2016 |

OTHER PUBLICATIONS

International Search Report and Written Opinion for PCT/CA2020/050857 (ISA/CA) mailed Aug. 24, 2020 (9 pages).

*Primary Examiner* — Mohamed Barakat
(74) *Attorney, Agent, or Firm* — Alston & Bird LLP (57) ABSTRACT

A system for alerting motorists travelling on a roadway in a vicinity of a vehicle is disclosed. The system includes one or more projector units, and a respective attachment structure for each of the one or more projector units for attaching the projector units to a portion of the vehicle. The one or more projector units are configured and arranged to project a light signal on to at least a portion of the roadway adjacent the vehicle and in a travel path of the motorist. The one or more projector units include at least one light flare projector unit and/or at least one signage projector unit. A school bus incorporating the system is also disclosed. A method for
(Continued)

alerting motorists travelling on a roadway in the vicinity of a vehicle is also disclosed.

22 Claims, 12 Drawing Sheets

(51) Int. Cl.
    *F21S 43/14*           (2018.01)
    *F21W 103/60*        (2018.01)
    *F21W 107/10*        (2018.01)
    *F21Y 115/10*        (2016.01)

(52) U.S. Cl.
    CPC ..... *B60Q 2400/50* (2013.01); *F21W 2103/60* (2018.01); *F21W 2107/10* (2018.01); *F21Y 2115/10* (2016.08)

(56) References Cited

U.S. PATENT DOCUMENTS

| | | | |
|---|---|---|---|
| 2006/0187010 A1* | 8/2006 | Berman | B60Q 1/50 340/932.2 |
| 2009/0037142 A1* | 2/2009 | Kates | F24F 11/52 702/182 |
| 2009/0273941 A1* | 11/2009 | Englander | B60Q 1/324 362/494 |
| 2012/0007507 A1* | 1/2012 | Niemann | G01D 21/02 315/82 |
| 2016/0167648 A1* | 6/2016 | James | B60Q 1/547 701/28 |
| 2018/0118095 A1* | 5/2018 | Kunii | B60Q 1/085 |
| 2018/0328564 A1 | 11/2018 | Albou et al. | |

\* cited by examiner

PROJECTION ALERTING SYSTEM FOR VEHICLES AND RELATED METHODS

CROSS-REFERENCE TO RELATED APPLICATIONS

The present application is a national phase entry of International Application No. PCT/CA2020/050857, filed Jun. 19, 2020, which claims benefit to U.S. Provisional Application No. 62/863,599, filed Jun. 19, 2019, and U.S. Provisional Application No. 62/939,898, filed Nov. 25, 2019, which are incorporated herein by reference in their entirety.

FIELD

The present disclosure relates generally to a projection alerting system for vehicles. In particular, the present disclosure relates to a projection system and related methods for altering motorists travelling on a roadway in a vicinity of a vehicle.

BACKGROUND

During normal operation some vehicles, such as passenger transport vehicles, e.g. school buses, must stop to allow passengers to enter and exit. Often a passenger must cross the roadway in front of and adjacent to the vehicle to reach the other side of the roadway. This may be hazardous when the roadway has one or more lanes of opposing traffic or even if motorists attempt to pass the vehicle while it is stopped.

Some passenger transport vehicles have added safety equipment to aid in minimizing the risk when loading or unloading passengers. For example, a stop arm is commonly attached to a school bus and appears to the oncoming motorist in their field of view. Under ordinary operating conditions, when the school bus door opens and the equipped stop arm is activated and extends out from the school bus, the oncoming motorists are required to stop and yield to the passengers while they cross the roadway. However, the stop arm may be only partially or not at all visible in a variety of school bus stopping locations due to the physical size of the stop arm, for example if the school bus drives on to a highway shoulder or sidewalk to stop.

Furthermore, motorists are used to stopping at mounted road signs in their field of view and stop lights at intersections, directly in front of them. Thus, due to distractions from complex highway conditions, weather or other reasons, motorists may not stop and instead become parties to collisions, injuries, and fatalities. For example, according to the US National Association of State Directors of Pupil Transportation Services, through a national survey in 39 states throughout the USA, 130,963 school bus drivers recorded that, in a one-day period, 95,319 motorists passed their buses illegally while stopped and the equipped stop arm was activated.

In order to reduce the risk of accidents, others have developed attachments to school buses which physically block the roadway adjacent to the school bus when the school bus is stopped. For example, see US Patent Application Publication US2003/0070603A1. However, these devices may introduce new hazards for both the motorists and the passengers of the school bus. Motorists may still not stop if they do not recognize that the school bus is present and stopped, resulting in the motorist crashing into the barrier.

SUMMARY

In one aspect, there is provided a system for alerting motorists travelling on a roadway in a vicinity of a vehicle, the system comprising one or more projector units, and a respective attachment structure for each of the one or more projector units for attaching the projector units to a portion of the vehicle such that the one or more projector units are configured and arranged to project a light signal on to at least a portion of the roadway adjacent the vehicle and in a travel path of the motorists, the one or more projector units including at least one light flare projector unit and/or at least one signage projector unit.

In another aspect, there is provided a school bus comprising a system as described herein, wherein each of the one or more projector units is attached to one of a body panel of the school bus, an end of a crossing arm of the school bus, a side mirror of the school bus, a stop arm of the school bus, a wind-guard of the stop arm, an octagon blade of the stop arm, a drive unit of the stop arm, a housing of a stop arm violation camera of the school bus and a bumper of the school bus.

In another aspect, there is provided a method for alerting motorists travelling on a roadway in the vicinity of a vehicle, the method comprising: operating one or more projector units attached to the vehicle to project at least one of a light flare and a pictogram onto at least a portion of the roadway adjacent the vehicle in a travel path of the motorists.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and components shown. In the drawings.

DETAILED DESCRIPTION

Embodiments of the present disclosure are directed to projection alerting systems and methods for vehicles to project alerts onto a roadway adjacent a vehicle, for example when the vehicle is stopped, for alerting motorists travelling on the roadway in a vicinity of the vehicle, such as motorists passing the vehicle or motorists in oncoming traffic.

According to some embodiments of the present disclosure, the system includes one or more projector units, and a respective attachment structure for each of the one or more projector units for attaching the projector units to a portion of the vehicle such that the one or more projector units are configured and arranged to project a light signal on to at least a portion of the roadway adjacent the vehicle and in a travel path of the motorists. The one or more projector units include at least one light flare projector unit and/or at least one signage projector unit.

Figure 1:
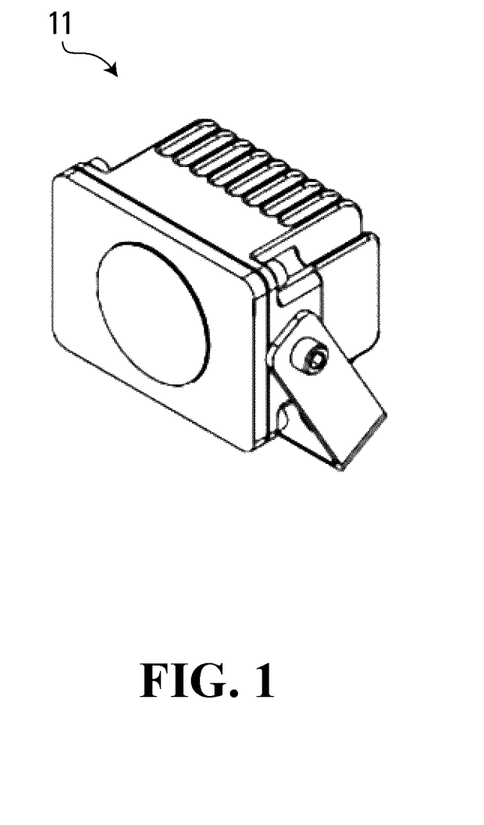
FIG. 1 is a front isometric view of a light flare projector unit according to embodiments of the present disclosure.
Figure 2:
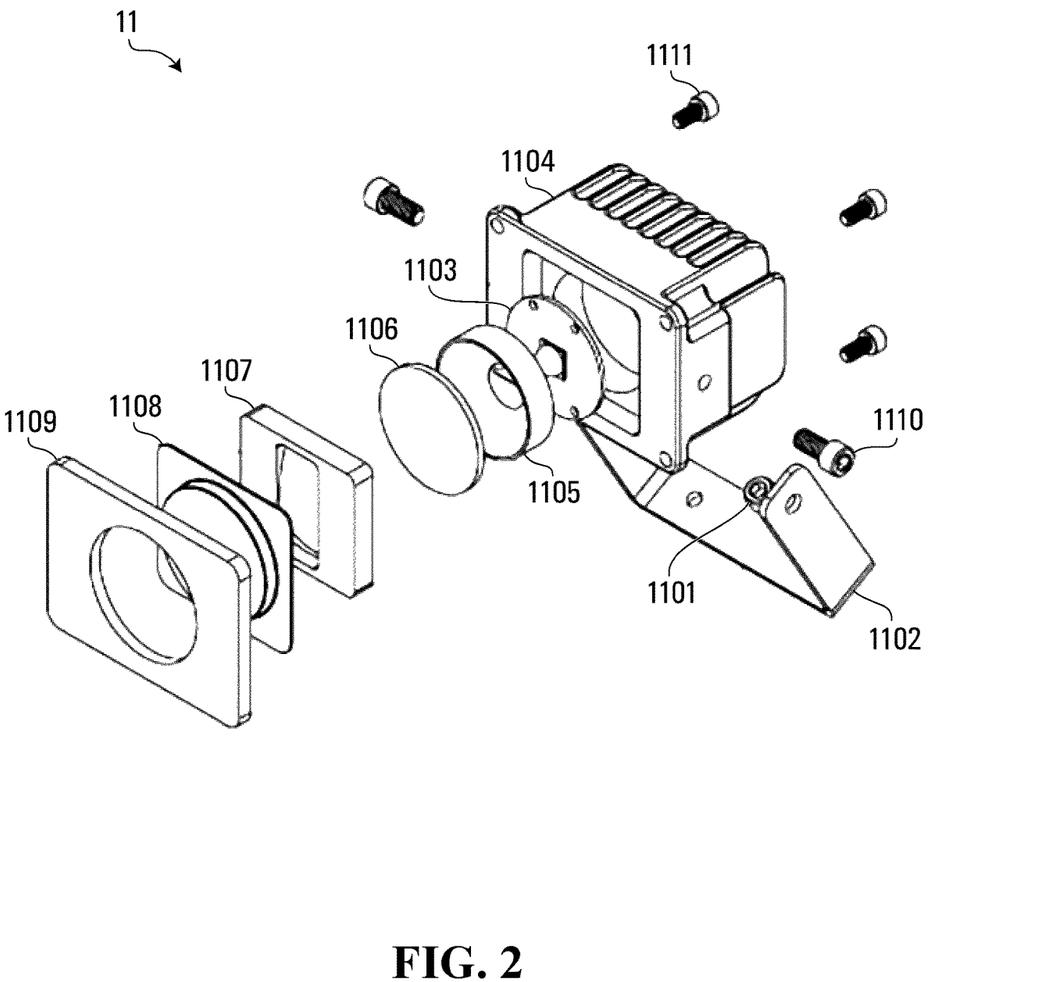
FIG. 2 is an exploded view of the light flare projector unit of FIG. 1.

Referring to FIGS. 1 and 2, one embodiment of a light flare projector unit 11 will be described. The light flare projector unit 11 may project a light signal, such as a light flare with a predetermined and desired geometry, such as a rectangular light beam, dashed light beam or spot flare. A respective attachment mounting bracket 1102 and mounting screws 1110 may be provided to attach the light flare projector unit 11 to the vehicle, such as a portion of a vehicle chassis body panel.

The respective attachment structure, such as the mounting bracket 1102, may also act as an angular adjustment mechanism to allow pivoting of the light flare projector unit 11, thereby allowing the light flare to be angled as desired to project on a desired portion of the roadway.

In the illustrated embodiment, a light source 1103, incorporating, for example a high power density LED or HID halogen lamp, is attached onto a water-sealed enclosure 1104. The enclosure 1104 may include heatsinking to help dissipate the significant amount of heat generated by the light source 1103.

A parabolic reflector 1105 acts as an auxiliary collimator to collimate light from the light source into a relatively concentrated light beam before entering a primary optical condenser lens 1106. The primary condenser lens 1106 may be constructed from optical grade crown glass in order to withstand the heat generated by the light source 1103.

An image stencil template 1107 with a specific stenciled geometry, such as a slot, is arranged between the condenser lens 1106 and an objective lens 1108. The stencil template 1107 defines the shape or geometry of the projected light flare. While a slot stencil is shown in the illustrated embodiments, other shapes are possible, including a rectangle, a dashed line, a circle, an oval, a diamond, a pentagon, an octagon and other shapes.

The objective lens 1108 may be a piece of plano-convex optical lens with a flange, which may contribute to waterproof grading with assistance of gasketing and a unit cover 1109.

Figure 3:
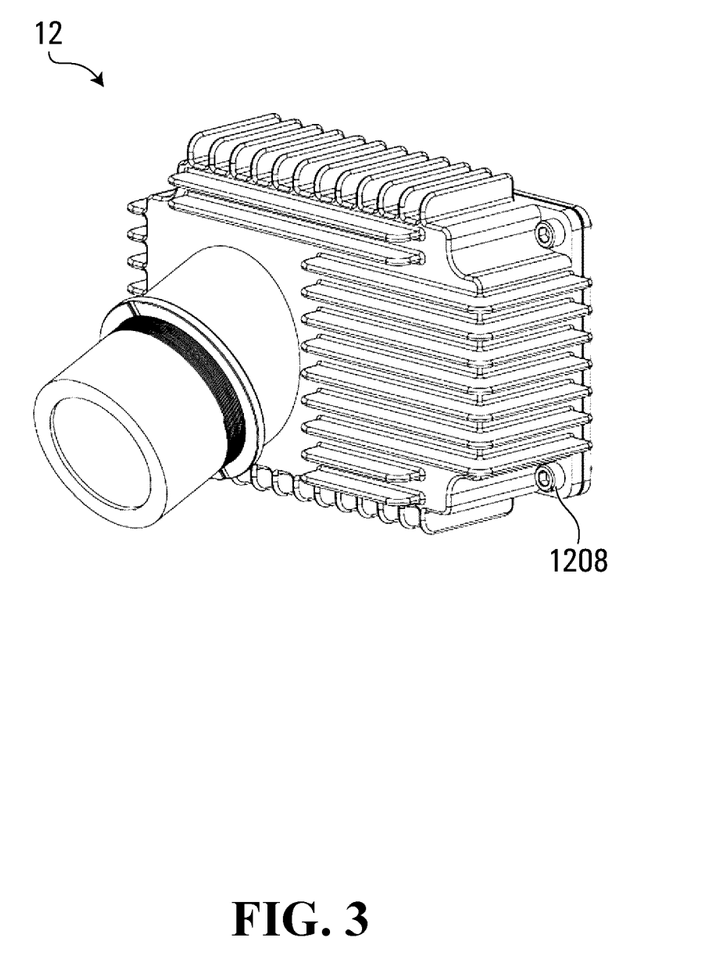
FIG. 3 is a front isometric view of a signage projector unit according to embodiments of the present disclosure.
Figure 4:
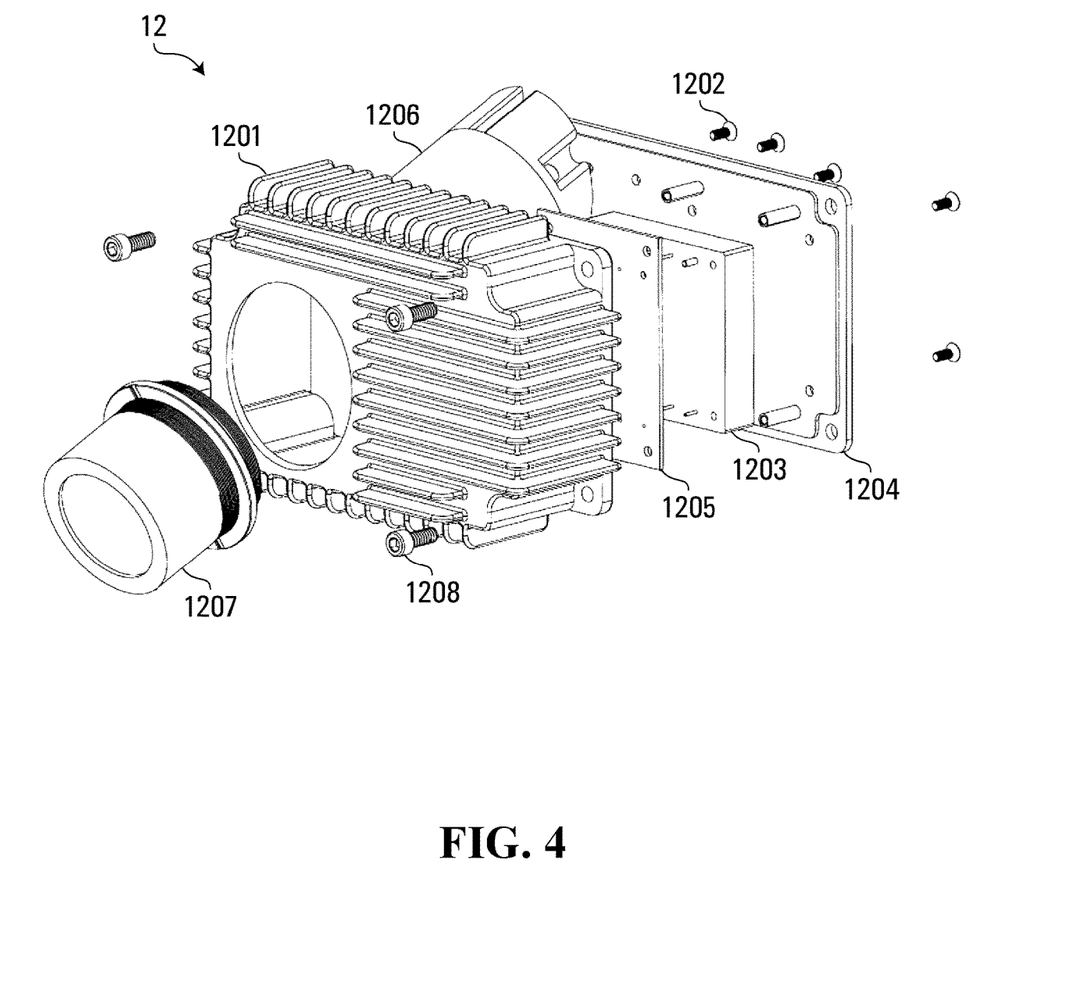
FIG. 4 is an exploded view of the signage projector unit of FIG. 3.

Referring to FIGS. 3 and 4, one embodiment of a signage projector unit 12 will be described. FIG. 3 depicts a front isometric view of the signage projector unit 12. This unit may be attached to a vehicle by using mounting screws 1208. But other attachment structures are possible, such as a bracket as described above in respect of the light flare projector unit 11.

FIG. 4 depicts the exploded view of a signage projector unit 12 and its components. The signage projector unit 12 includes a piece of die casting enclosure 1201 with multiple fins on the exterior for heat dissipation. The enclosure also provides a weather sealed environment for internal optical components and electronic circuits. The fins of the enclosure 1201 are for dissipating into the ambient atmosphere under either static convection condition or with ram airflow when the vehicle is driving at speed. In some embodiments or application, for example where there is higher than usual power demand, wicking type heat pipes with actively controlled cooling fans may be included.

Within the signage projector unit 12, heat sensitive components, such as a light source and power supply module 1203 are attached to a mounting base 1204, which also performs as a heat spreader. Excessive heat generated from either the light source or the power supply module 1203 may be dissipated into either the ambient environment or a vehicle body panel, which has a significantly larger heat capacity. Gasketing with a desired thermal conductivity may be provided between the enclosure 1201 and the mounting base 1204. Controller module 1205, such an integrated circuit (IC) controller module, may provide functionality such as voltage regulating, load dump protection, and low voltage shut off features to this unit.

In addition, the controller module 1205 may also provide automatic dimming and/or automatic activation functionality based on onboard or stand alone ambient lighting sensor, or sensors, and may provide auto charging and discharging features if a power storage device, such as a battery or a super capacitor bank, is provided to reduce the instantaneous current on the electrical system of the vehicle. This will be described in further detail below.

A light source and condenser lenses module 1206 generates and collimates the high lumen light generated by the light source, including, for example, high power density LED or HID halogen lamps. A pictogram image template is also integrated into the module 1206, as discussed further below.

An objective lens module 1207, which includes a set of optical lenses, provides a desired image quality and may compensate for a key-stoning effect due to projecting at angles less than 90 degrees.

Figure 5:
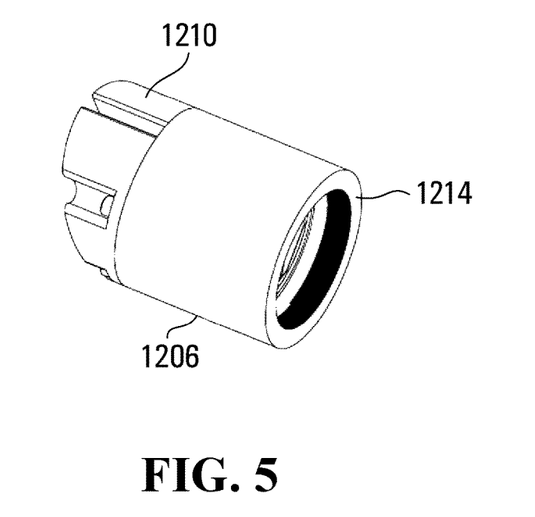
FIG. 5 is an isometric view of the light source and condenser lenses module of the signage projector unit of FIG. 3.

Referring to FIGS. 5 to 8, the light source and condenser lenses module 1206 will be described in more detail. FIG. 5 shows a front isometric view of the module 1206. The condenser lens holder 1214 is attached to the light source heat spreader 1210, which together provide a self-contained sub-assembly, compatible with and to be assembled into the signage projector unit 12.

Figure 6:
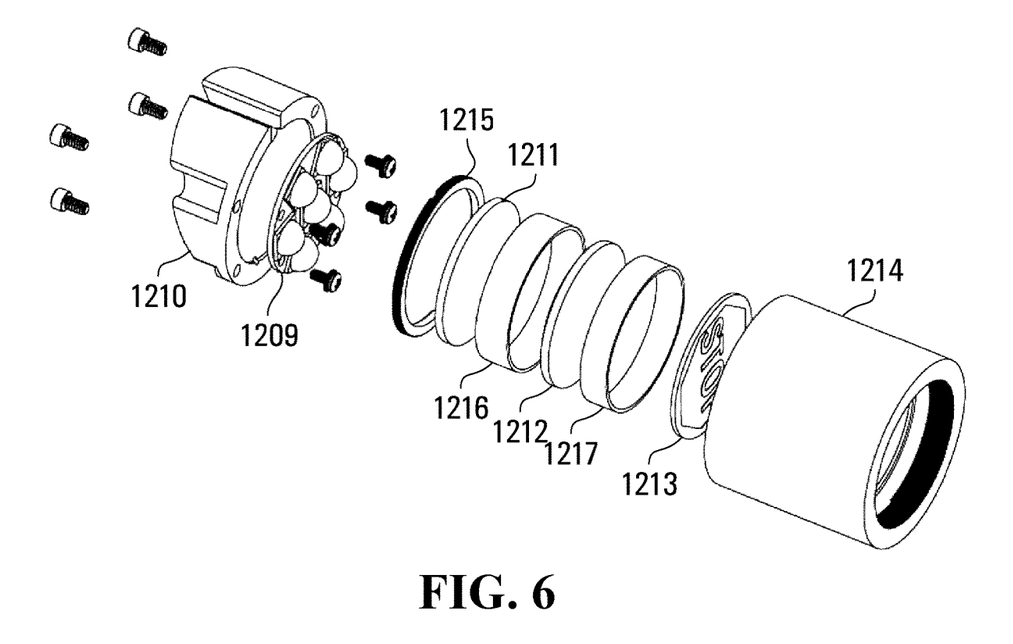
FIG. 6 is an exploded view of the module of FIG. 5.

FIG. 6 shows an exploded view of the module 1206 and its components. A high power density light source 1209, such as a chip on board (COB) LED array or numerous discrete single die LED lamps providing a desired amount of luminous lux, is attached onto a heat spreader 1210. The heat spreader 1210 provides heat conductivity to dissipate heat into the enclosure 1201 and the mounting base 1204.

A plurality of optical lenses 1211, 1212 are secured with an image template 1213 within a cylindrical lens holder 1214. A threaded lock ring 1215 and two spacer rings 1216, 1217 are included to maintain a proper spacing between the optical components.

Figure 7:
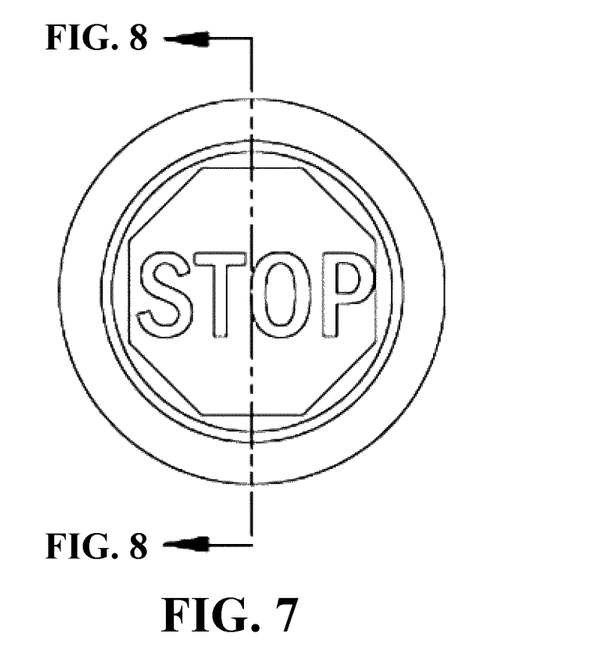
FIG. 7 is a front view of the module of FIG. 5.
Figure 8:
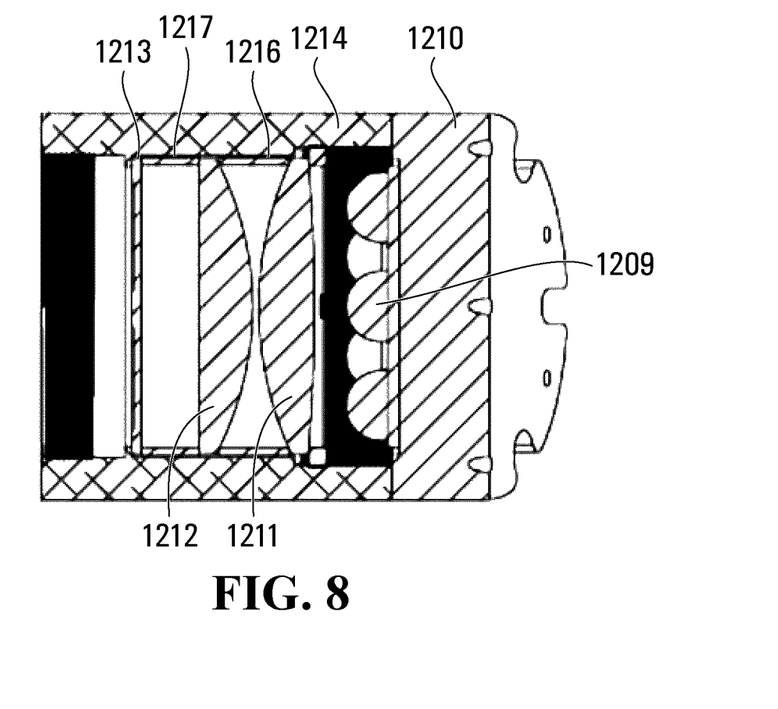
FIG. 8 is a cross-sectional view of the module of FIG. 5 taken along line 8-8 in FIG. 7.

FIG. 7 shows a front view of the light source and condenser lenses module 1206 and FIG. 8 shows a cross-section along the line 8-8 in FIG. 7. While an octagonal STOP sign is shown as the pictogram on the image template 1213, in other embodiments, other pictograms may be used. More generally, a wide range of pictograms may be used, with or without symbols or writing, to alert motorists on the roadway. Some such pictograms may include a red octagon, a red octagon with the word STOP, a yellow diamond, a yellow diamond with the word SLOW, and others.

Figure 9:
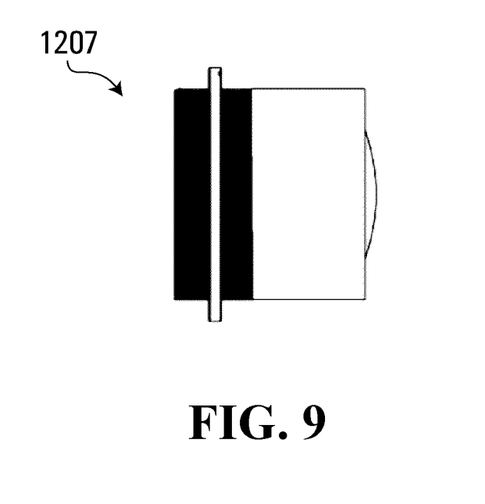
FIG. 9 is a side view of the objective lens module of the signage projector unit of FIG. 3.
Figure 10:
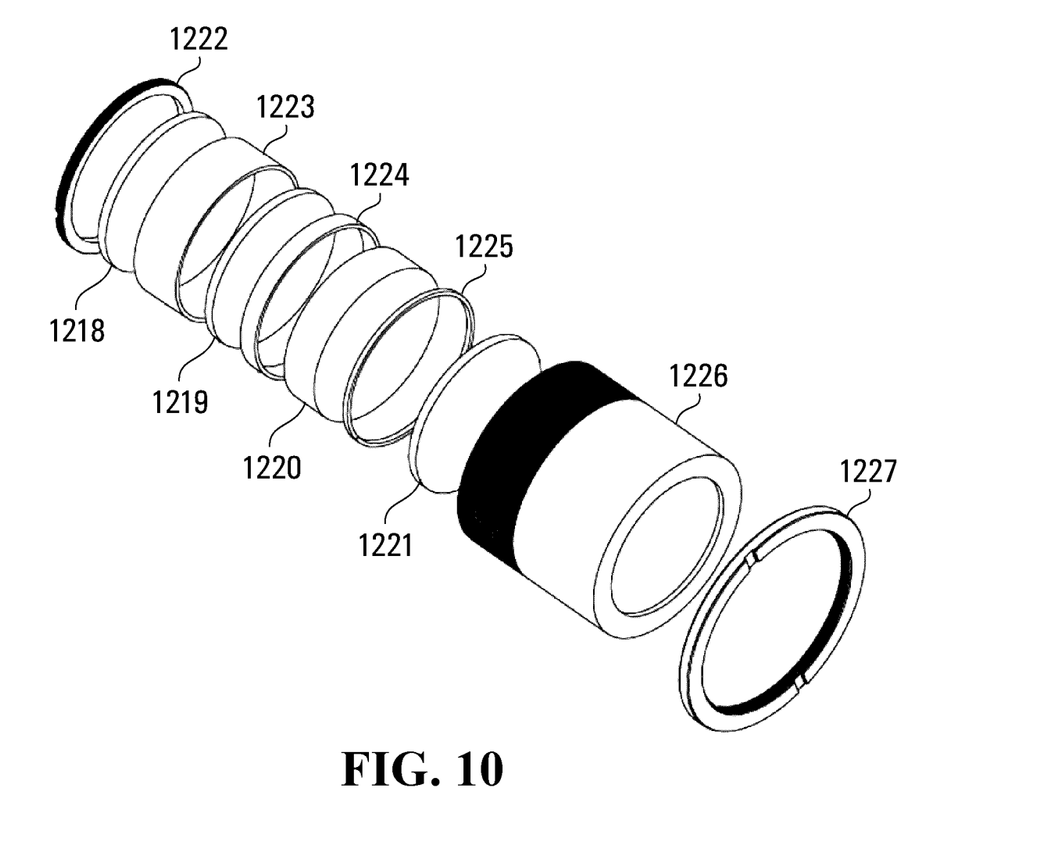
FIG. 10 is an exploded view of the module of FIG. 9.

Referring to FIGS. 9 and 10, the objective lens module 1207 will be described. Four optical lenses 1218, 1219, 1220, 1221 are included to aid in overcoming spherical aberration, which is a common undesired phenomenon occurring with the use of a single piece of spherical lens.

An external threaded lock ring 1222 and three spacer rings 1223, 1224, 1225 are used to secure the optical lenses and other components within an objective lens holder 1226 and to maintain proper spacing. The objective lens holder 1226 has external threads for mating with the internal threads from the condenser lens holder 1214. The threads provide for a fine pitch thread mating allowing a fine-tuning between the image template 1213 and the objective lens module 1207. This may aid in ensuring a crisp, clear image of the pictogram on the roadway by adjusting the distance between the image template 1213 and the objective lens module 1207 based on, for example, a height of the signage projector unit 12 off the ground.

A backup lock ring 1227 with internal threads is used to secure the condenser lens holder 1214 and the objective lens module 1207 from loosening due to, for example, vibrations or temperature cycles.

In some embodiments, the projector units maybe equipped with mechanisms to enable physical covers protecting optical components from dirt, mud, and slush. Such cover mechanisms may be controlled by a controller automatically or manual by a user or via a signal sent through the vehicle's control console. For example, in some embodiments, the lens cover may be operated by a driver of the vehicle or automatically via a pre-programmed controller based on operating logic.

While embodiments of the one or more projector units have been described, other embodiments are also possible. More generally, the one or more projector units may be each configured as a "self-contained" unit having an enclosure, a set of optical lenses and a light source, such as a luminaire incorporating LED or HID lamps. The light source may incorporate with various of optical components, such as parabolic reflector, image template and transparent or translucent optical lenses to form the projections.

In some embodiments, the projector units may be configured to project the light flare and/or signage in a solid, flashing and/or strobing mode. This may be combined with the projection of words, such as "STOP", to further attract the attention of motorists by, for example, flashing the entire image and the word "STOP". If being equipped with more than one projecting unit, such as discussed below, the projection alerting system could be configured to strobe signals alternately or in a predetermined order.

Furthermore, in some embodiments, the signage projector unit may be equipped with an image template carousel allowing the signage projector to project different images or words in sequence to signal a message to motorists. Moreover, it will be understood that each individual projector unit may be configured to project multiple signals which could be automatically controlled per a pre-programmed sequence and/or manually selected by, for example, an operator of the vehicle via a control interface operably connected to the system.

Figure 11:
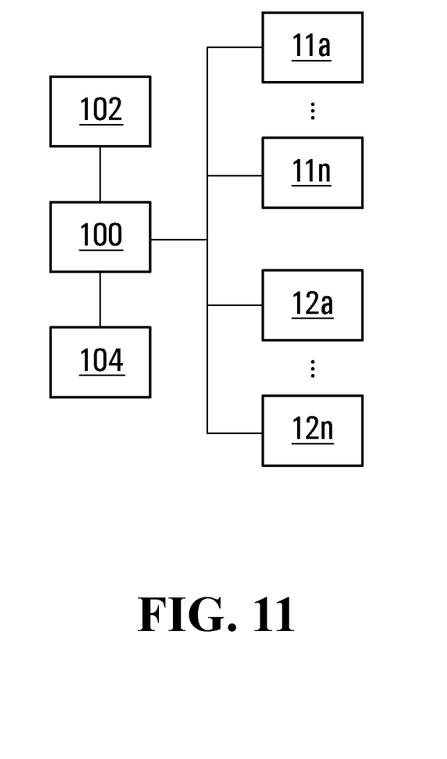
FIG. 11 is a schematic view of an embodiment of a control system according to the present disclosure.
Figure 12:
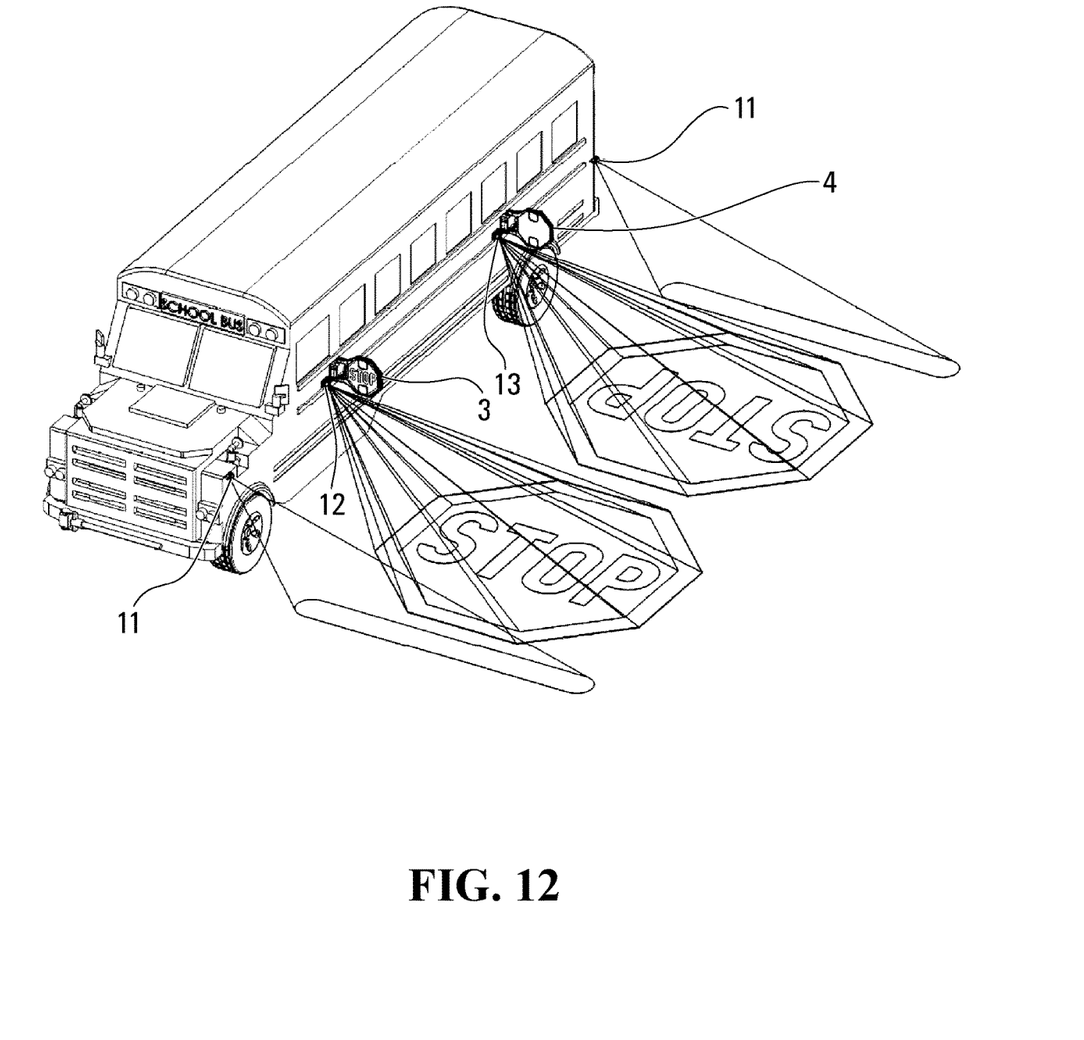
FIG. 12 shows a school bus with a projection alerting system according to one embodiment of the present disclosure.

More generally, referring to FIG. 11, a controller 100 may be provided and operably connected to one or more light flare projector units 11a to 11n, and signage projector units 12a to 12n and configured to control operation of the projector units including activation and deactivation, power regulation, lighting mode (solid, flash and strobe), image selection in the case of multiple possible pictograms, and other aspects. As illustrated, there may be a single controller operably connected to multiple projector units, but each individual projector unit may also have a controller specific to that particular unit, for example an embedded controller such as the controller module 1205 described above. For example, an IC board above may be configured to control some or all of the functionalities that may be controlled by a central controller 100 as shown.

The controller 100 may be further operably connected to one or more light sensors 102 and/or temperature sensors 104. For example, the controller may be configured to adjust the power provided to one or more of the projector units based on readings of ambient light levels from the light sensors 102. If ambient light levels are high, the controller may increase the power to one or more projector units to ensure their projections are visible. Moreover, the controller may be configured to deactivate one or more of the projector units if ambient light levels exceed a predetermined threshold value since their projections would no longer be clearly visible by motorists, thereby saving power.

Similarly, the controller may be configured to regulate power to the one or more projector units based on the temperature readings of one or more of the temperature sensors 104. The temperature sensors 104 may be installed and provide feedback of the temperature of components of the projector units, thus preventing overheating of components which may be damaged from excessive heat.

The sensors 102, 104 may be placed at various locations to provide the desired readings. For example, light sensors 102 may be placed near the projector units or on other portions of the vehicle, such as near the driver's dash. One or more such sensors 102 may also be placed in an optical path of projector units, the controller being configured to sense and determine the cleanliness of a particular projector unit as a function of the light being produced and the power being supplied to the unit.

The controller 100 may also receive further signals from control systems of the vehicle. For example, in cases where the vehicle includes safety equipment that is activated when needed to ensure safe operation, such as an extendible crossing arm, extendible stop arm, stabilizers, etc., an activation signal used to activate such safety equipment may also activate one or more of the projector units to alert motorists. Other activations signals may also be used, such as a signal to open the door of a passenger transport vehicle or the rear compartment of an emergency vehicle.

Moreover, as noted above, the controller 100 may be used to control physical covers for protecting optical components from dirt, mud, and slush.

The alerting system may be used in conjunction with other safety equipment to improve safe use of the vehicle. For example, where the vehicle is a bus, such as a school bus, making frequent stops to let passengers embark and disembark, the alerting system may be used every time the bus stops to prevent motorists from passing the bus.

More generally, the light flare and/or signage may be projected onto various parts of the roadway into the travel path of motorists. For example, the projector units may project the rectangular light beam substantially perpendicular to a side of the vehicle, such as the driver side, thereby creating a light strip, bar or stop line across at least one lane of traffic at which motorists should stop. This may be combined with pictograms, such as a stop sign following the light strip in a direction of travel of the motorists.

The projectors may project the light signal so as to traverse at least a portion of one lane of oncoming traffic adjacent the vehicle. For example, the light flare projector unit may be configured so that the light beam is sized to substantially traverse a single or plurality of lanes of the roadway. The angular adjustment mechanism may also aid in adjusting the angle of the projection in a range from immediately adjacent the vehicle to another side of the roadway.

In some embodiments, the light signal may be configured and arranged to target motorists who would otherwise not notice the traffic control signals of the vehicle, such as the flashing stop arm on a school bus. The location of the projected light signal on the roadway may be chosen to alert oncoming motorists before they reach the area adjacent to the vehicle, in distance. Thus, the light flare and/or signage may be projected rearward or frontward of the vehicle.

In some embodiments according to the present disclosure, there is provided a school bus incorporating the system described herein. Some embodiments where the system is incorporated into a school bus are discussed below with reference to FIGS. 12 through 15. While some alternative positionings of the projector units are shown in the illustrated embodiments, it should be understood that the projector units may be attached to the vehicle at a wide variety of locations, including but not limited to one of a body panel of the school bus, an end of a crossing arm of the school bus, a side mirror of the school bus, a stop arm of the school bus, a wind-guard of the stop arm, an octagon blade of the stop arm, a drive unit of the stop arm, a housing of a stop arm violation camera of the school bus and a bumper of the school bus.

Referring to FIGS. 12 to 15, different variants of the system described herein may be used to ensure visual alerting of motorists traveling on the roadway in a vicinity of the vehicle. For example, a signage projector unit 12 may be located adjacent to a front facing stop arm 3 of the vehicle, depending on vehicle size and desired target area for the projection. This unit may form a human-readable stop signage, which could be equivalent in size to one highway lane width, on the roadway adjacent to the front of the school bus.

In addition, a rear facing signage projector unit 13 may be located adjacent to the rearward facing stop arm 4 of the vehicle, thus forming a stop signage on the roadway adjacent to the rear section of the school bus. The signage projector units may be activated together with deployment of the stop arms, emphasising the stop signal to the oncoming motorists.

In addition, two light flare projector units 11 may be located adjacent opposite ends of a length of the vehicle in order to project two bright light zoning beams. These beams could be adjusted/tuned to accommodate the demand of daily bus operation; for example, they could be adjusted to reach to the most adjacent lane, or one lane further.

Figure 13:
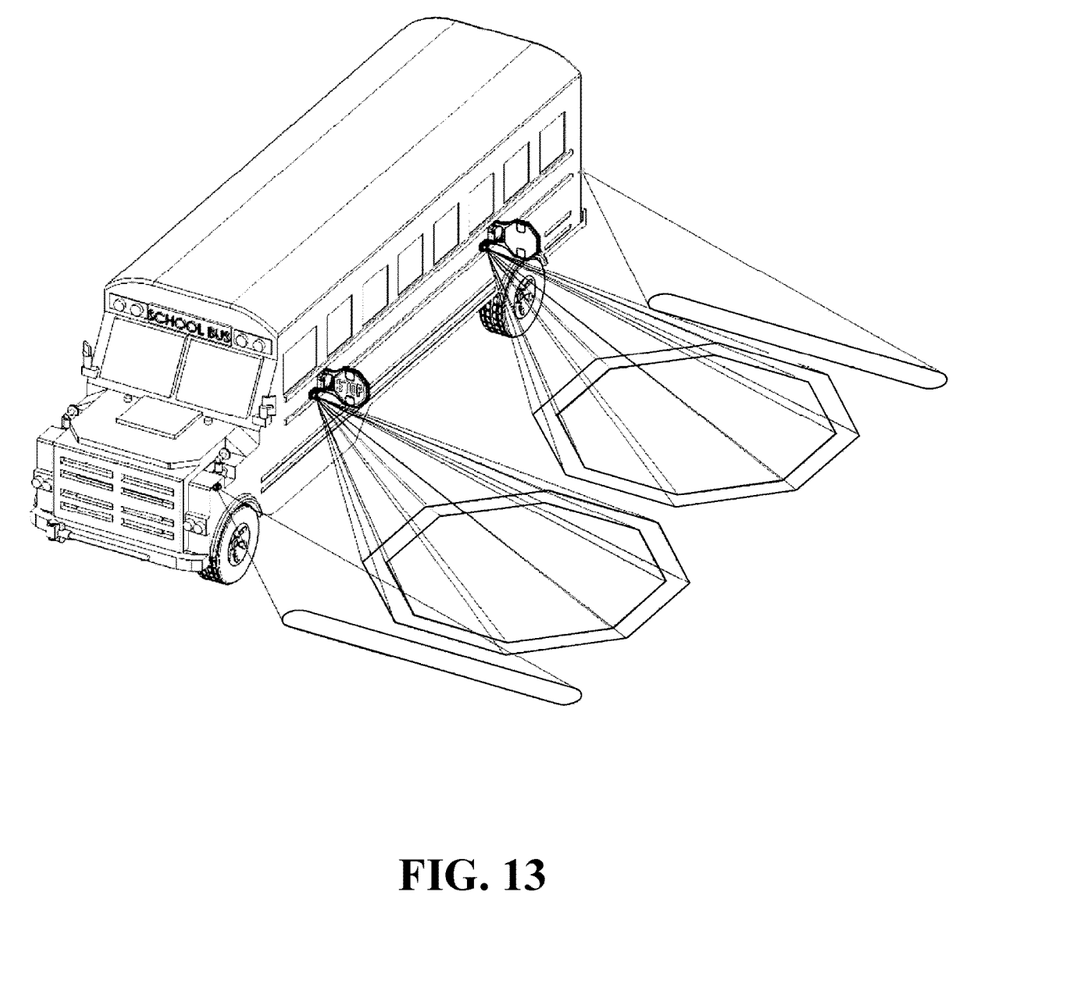
FIG. 13 shows a school bus with a projection alerting system according to one embodiment of the present disclosure.

Referring to FIG. 13, in some embodiments, literal information may not be included in the signage and instead a red octagon, recognized as a generic "stop" symbol requiring a full stop, could be projected. Otherwise, the configuration of projector units is similar to that of FIG. 12.

Figure 14:
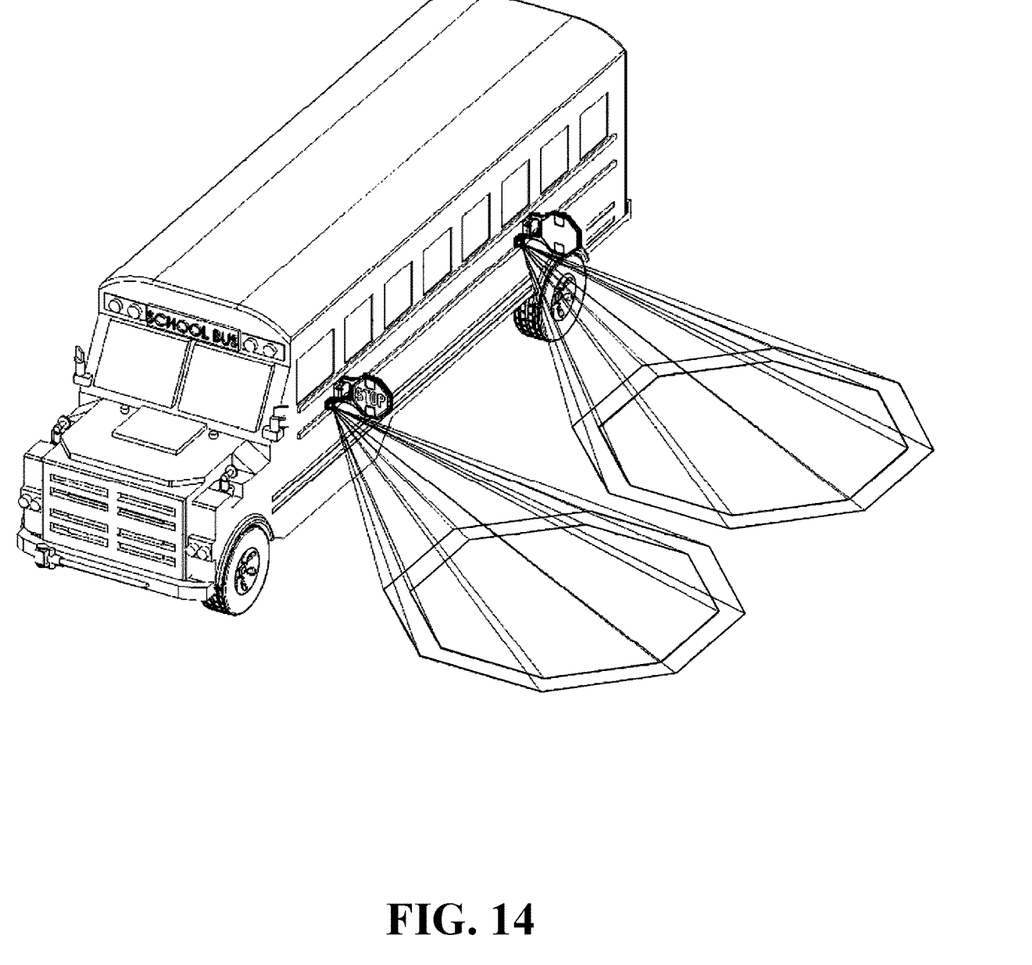
FIG. 14 shows a school bus with a projection alerting system according to one embodiment of the present disclosure.
Figure 15:
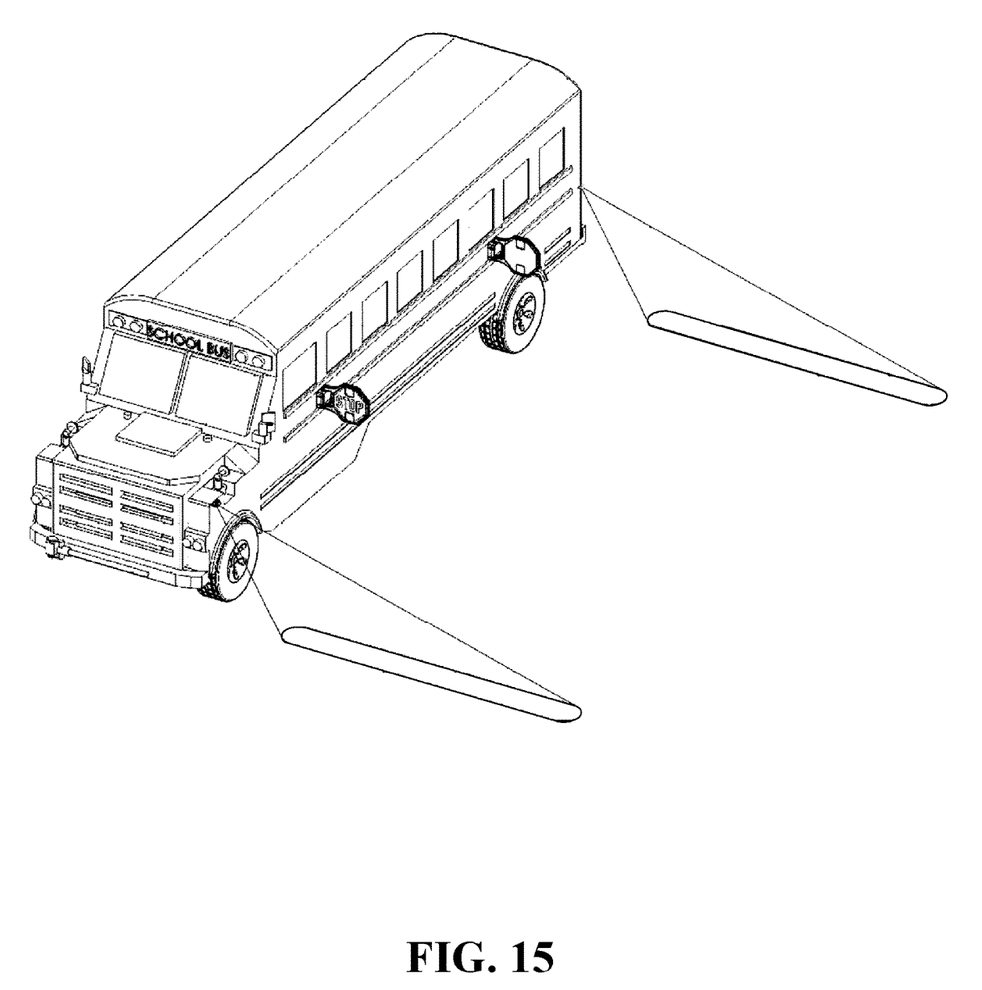
FIG. 15 shows a school bus with a projection alerting system according to one embodiment of the present disclosure.

Similarly, referring to FIGS. 14 and 15, in some embodiments, either flare projector unit 11 or signage projector unit 12 may be used stand alone, combining with the application of a stop arm in all circumstances, for instance, on the driver side of the vehicle or on the passenger side of the vehicle. Ultimately, the desired configuration of the system as described herein is a function of multiple factors including, demand of the school bus on a routine basis, for example, the frequency of stopping on roadways and loading/unloading passengers from curbside or a sidewalk, where and when the bus would typically stop, whether or not it stops on a highway shoulder or loads/unloads passengers from the further side of a cyclist lane, etc.

More generally, as noted above, the principles of the present disclosure could be applied mutatis mutandis to other vehicles, including, but not limited to:

Passenger transport buses such as those used in public transit while loading or unloading passengers.

Emergency vehicles, for example when pulled over on a highway shoulder and responding to an emergency on site in person.

Construction vehicles or natural resource cruising vehicles, which may require frequent stops on the highway and perform designated jobs on site.

Tow trucks, which may require safety zoning to be able to maneuver and impound target vehicles on the roadway.

Vehicles used for transporting dangerous goods, which may require displaying hazard pictograms.

When being implemented in these applications, light flare, tint color and pictograms may be changed accordingly and as desired, such as strobing blue and red light, speed limit sign, yellow diamond shape as a slow down sign, strobing light zoning, etc.

Moreover, the system may include additional components depending on the size of the vehicle. In some larger vehicles, a stand alone voltage booster module may be deployed at the fuse panel, battery bay or dash, distributing power at higher voltage than the vehicle voltage to minimize the current draw and voltage drop across the full length of the vehicle. In some embodiments, a type of energy storage device, such as a battery or a super capacitor bank, may be deployed to reduce the instantaneous current on the electrical system of the vehicle.

Moreover, various attachment structures may be employed to attach the projector units of the present disclosure to the portions of the vehicle. The attachment structure may include additional components such as motors, drive systems, angling mechanisms, and other components that may allow these projector units to tilt and be directed to affect the location of the projections. Such angular adjustment mechanisms may be controlled by a controller automatically or manual by a user or via a signal sent through the vehicle's control system. For example, in some embodiments, the positioning of the light signal may be dynamically controlled by a driver of the vehicle or automatically via a pre-programmed controller.

In some embodiments, the deployment of the projection may be linked to the control systems of the vehicle, such as the passenger door control switch, when the vehicle is stopped and allowing passengers to enter/exit the vehicle.

As noted above, in some embodiments, the system disclosed herein may be physically and/or electronically integrated with and/or operably connected to a stop arm deployment system used to deploy stop arms. Some such stop arm systems are described in PCT International Application PCT/CA2019/050968, filed Jul. 12, 2019, and which is hereby incorporated by reference herein in its entirety. The controller of a stop arm deployment system may control activation and/or operation of the projection alerting system described herein. For example, the controller may be configured to only activate the projection alerting system upon complete deployment of the stop arm. Alternatively, it may be configured to activate the projection alerting system upon the beginning of deployment of the stop arm, on stopping of the vehicle and before deployment of the stop arm, or at other times as desired. The controller of the stop arm deployment system may also be configured to control, either automatically or upon input from an operator of the vehicle, the type, shape, location, message, colour, positioning, angling, intensity, and other aspects of the light signal projected by the illumination system.

While the disclosure has primarily been described in terms of a system, the present disclosure also includes all related methods of operation and use of the system.

In some embodiments according to the present disclosure, there is also provided a method for alerting motorists travelling on a roadway in the vicinity of a vehicle. The method comprising includes operating one or more projector units attached to the vehicle to project at least one of a light flare and a pictogram onto at least a portion of the roadway adjacent the vehicle in a travel path of the motorists.

As discussed above, this may include projecting the light flare or pictogram in the travel path of motorists passing the vehicle, projecting the light flare or pictogram in the travel path of motorists in a lane of oncoming traffic, activating the projector units when the stop sign, where present, is extended, projecting a light flare across and at least one pictogram following the light flare in a direction of travel of motorists passing the vehicle, regulating power to the one or more projector units as a function of at least one of ambient light levels and a temperature of one or more components of each of the one or more projector units, deactivating the one or more projector units if ambient light levels exceed a predefined threshold, and operating at least one of the one or more projector units in a flashing or strobe mode.

Numerous specific details have been set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a nonexclusive inclusion. For example, a composition, a process, method, article, or apparatus that comprises a list of elements is not necessarily limited to only those elements but may include other elements not expressly listed or inherently present therein.

As used herein the terms "approximately," "about," "substantially" and variations thereof are intended to include not only the exact value qualified by the term, but to also include some slight deviations therefrom, such as deviations caused by measuring error, manufacturing tolerances, wear and tear on components or structures, stress exerted on structures, and combinations thereof, for example.

Use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Moreover, it will be understood that features of one embodiment may be combined with features of other embodiments, even if not expressly recited or described as a combination.

What has been described is merely illustrative of the application of principles of embodiments of the present disclosure. Other arrangements and methods that could be implemented by those skilled in the art based on the present disclosure are within the scope of the present disclosure.

The invention claimed is:

1. A system for alerting motorists travelling on a roadway in a vicinity of a school bus, the school bus comprising a deployable stop arm, the system comprising one or more projector units, and a respective attachment structure for each of the one or more projector units for attaching the projector units to a portion of the school bus such that the one or more projector units are configured and arranged to project a light signal on to at least a portion of the roadway adjacent the school bus and in a travel path of the motorists, the one or more projector units including at least one signage projector unit configured to project a STOP sign on to the roadway in the travel path of the motorists when the deployable stop arm is deployed.

2. The system of claim 1, further comprising at least one light flare projector unit, wherein each light flare projector unit comprises a light source, an optical collimator and an image stencil defining a shape of the light flare.

3. The system of claim 2, wherein the shape is a rectangle, a dashed line, a circle, an oval, a diamond, a pentagon, an octagon, or other geometric shapes.

4. The system of claim 1, wherein each signage projector unit comprises a light source, an optical collimator, one or more pictogram templates, and a set of objective lenses.

5. The system of claim 1, wherein the respective attachment structure comprises an angular adjustment mechanism to alter the projection angle of the corresponding projector unit such that the light signal is capable of being projected within a range from a lane of the roadway immediately adjacent the school bus to an other side of the roadway.

6. The system of claim 1, further comprising one or more light sensors.

7. The system of claim 6, further comprising a controller configured to regulate a power output of at least one of the one or more projector units based on a level of ambient light outside the school bus.

8. The system of claim 6, further comprising a controller configured to deactivate the one or more light projector units if a level of ambient light outside of the school bus exceeds a threshold value.

9. The system of claim 6, wherein one or more of the light sensors are positioned in an optical path of each of the one or more projector units.

10. The system of claim 9, further comprising a controller configured to determine a cleanliness of the one or more projector units based on readings of the one or more light sensors in the optical path.

11. The system of claim 6, further comprising a controller configured to detect a fault of one or more of the light sensors based at least in part on sensor readings from the light sensors.

12. The system of claim 1, further comprising one or more temperature sensors to detect a temperature of one or more components of the one or more projector units.

13. The system of claim 12, further comprising a controller configured to regulate a power supply to the one or more projector units based on readings from the one or more temperature sensors.

14. The system of claim 1, further comprising an energy storage device operably connected to the one or more projector units and an electrical system of the school bus to reduce an instantaneous current draw on the electrical system of the school bus.

15. A school bus comprising the system of claim 1, wherein each of the one or more projector units is attached to one of a body panel of the school bus, an end of a crossing arm of the school bus, a side mirror of the school bus, a stop arm of the school bus, a wind-guard of the stop arm, an octagon blade of the stop arm, a drive unit of the stop arm, a housing of a stop arm violation camera of the school bus and a bumper of the school bus.

16. A method for alerting motorists travelling on a roadway in the vicinity of a school bus, the method comprising:
operating one or more projector units attached to the school bus to project at least one STOP sign onto at least a portion of the roadway adjacent the school bus in a travel path of the motorists when a deployable stop arm of the school bus is deployed.

17. The method of claim 16, wherein operating the one or more projector units further comprises projecting a light flare-in the travel path of motorists passing the school bus.

18. The method of claim 17, wherein operating the one or more projector units comprises projecting the light flare in the travel path of motorists in a lane of oncoming traffic.

19. The method of claim 16, wherein operating the one or more projector units comprises projecting a light flare across-and at least one pictogram following the light flare in a direction of travel of motorists passing the school bus.

20. The method of claim 16, further comprises regulating power to the one or more projector units as a function of at least one of ambient light levels and a temperature of one or more components of each of the one or more projector units.

21. The method of claim 16, further comprising deactivating the one or more projector units if ambient light levels and/or temperature exceed a predefined threshold.

22. The method of claim 16, wherein operating the one or more projector units comprises operating at least one of the one or more projector units in a flashing or strobe mode.

* * * * *

UNITED STATES PATENT AND TRADEMARK OFFICE
CERTIFICATE OF CORRECTION

PATENT NO. : 12,077,094 B2
APPLICATION NO. : 17/620400
DATED : September 3, 2024
INVENTOR(S) : David Beernaert et al.

Page 1 of 1

It is certified that error appears in the above-identified patent and that said Letters Patent is hereby corrected as shown below:

In the Claims

In Column 12, Line 5, Claim 17, delete "flare-in" and insert -- flare in --, therefor.
In Column 12, Line 11, Claim 19, delete "across-and" and insert -- and --, therefor.

Signed and Sealed this
Fourth Day of February, 2025

Coke Morgan Stewart
*Acting Director of the United States Patent and Trademark Office*